United States Patent [19]

Rosenplenter

[11] Patent Number: 6,017,567
[45] Date of Patent: *Jan. 25, 2000

[54] PROCESS FOR COATING EDIBLE, CHEWABLE, OR PHARMACEUTICAL CONES WITH A COATING

[75] Inventor: Kurt Christian Rosenplenter, Alpen, Germany

[73] Assignee: Cerestar Holding B.V., LA Sas van Gent, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/874,631

[22] Filed: Jun. 13, 1997

[30] Foreign Application Priority Data

Jun. 19, 1996 [GB] United Kingdom ............... 9612821

[51] Int. Cl.$^7$ ....................................... A23G 3/30
[52] U.S. Cl. .................... 426/5; 426/6; 426/303; 426/304; 426/307
[58] Field of Search ................... 426/3, 5, 302, 426/103, 303, 6, 304, 307

[56] References Cited

U.S. PATENT DOCUMENTS

| | | | |
|---|---|---|---|
| 4,238,510 | 12/1980 | Cherukuri et al. | 426/5 |
| 4,423,086 | 12/1983 | Devos et al. | 427/3 |
| 4,792,453 | 12/1988 | Reed et al. | 426/5 |
| 5,248,508 | 9/1993 | Reed et al. | 426/5 |
| 5,270,061 | 12/1993 | Reed et al. | 426/5 |
| 5,298,263 | 3/1994 | Yatka et al. | 426/5 |
| 5,376,389 | 12/1994 | Reed et al. | 426/5 |
| 5,462,754 | 10/1995 | Synosky et al. | 426/4 |
| 5,478,593 | 12/1995 | Serpelloni et al. | 426/303 |
| 5,536,511 | 7/1996 | Yatka | 426/5 |
| 5,603,970 | 2/1997 | Tyrpin et al. | 426/5 |
| 5,665,406 | 9/1997 | Reed et al. | 426/5 |
| 5,716,652 | 2/1998 | Barkalow et al. | 426/5 |

FOREIGN PATENT DOCUMENTS

| | | |
|---|---|---|
| 625 311 | 11/1994 | European Pat. Off. . |
| 95/07621 | 3/1995 | WIPO . |

*Primary Examiner*—Cynthia L. Nessler
*Attorney, Agent, or Firm*—Pillsbury Madison & Sutro LLP

[57] ABSTRACT

The present invention discloses an improved method for applying sugarfree hard coatings to cores consisting of edible, chewable or pharmaceutical components. The present invention discloses a process for coating cores wherein the sorbitol syrup is applied to a rotating mass of cores and then at least one other of the selected polyols is added in a crystalline form. The coated cores are dried and the process is repeated until a coating of the desired thickness and composition is obtained. The crunchiness of the coatings according to the process of this invention is at least comparable to that obtained with sucrose.

9 Claims, No Drawings

PROCESS FOR COATING EDIBLE, CHEWABLE, OR PHARMACEUTICAL CONES WITH A COATING

TECHNICAL FIELD

The present invention discloses an improved method for applying sugarfree hard coatings to cores consisting of edible, chewable or pharmaceutical components. The method makes use of crystalline polyols. The present invention relates to sugarfree hard coatings obtained by the application of a combination of sorbitol syrup and at least one other crystalline polyol. The invention also relates to products coated with the said compositions. The coatings based on the compositions of the present invention show an increased crispiness and/or crunchiness. The method for applying the coating is also improved in that the crispy structure is obtained faster.

BACKGROUND OF THE INVENTION

Hard coatings of edible, chewable or pharmaceutical compositions were until recently made of sugars such as saccharose, dextrose, fructose or glucose syrups. Following intensive campaigns for the diminishment of the incidence of caries these coatings are now increasingly made using sugarfree compositions i.e. compositions containing sorbitol, xylitol, mannitol or hydrogenated starch hydrolysates.

The process for applying the coatings to the cores generally consists of rotating the cores in a rotating installation at a desired speed and temperature, applying the coating in a liquid form, allowing a film to be formed and drying the material. Variations of this process have been developed and often the process is repeated until the coatings have the desired thickness.

The polyols sorbitol and xylitol are often used in sugarfree coating applications.

International patent application WO 81/01100 describes a hard coating process. In this process the conditions are chosen in such a way that sorbitol syrup can be used as coating fluid.

EP 0 273 856 describes a process for producing a sorbitol coated comestible. The process comprises applying to a substantially anhydrous edible core at least two coating solutions comprising sorbitol to coat the edible core. The first coating solution comprises (a) about 77 to about 81 wt % sorbitol solution containing from about 65 to about 75 wt % sorbitol, and (b) about 9.5 to about 12.5 wt % crystalline sorbitol powder together with a film-forming agent and a crystallisation retardant. The second coating solution comprises (a) from about 82 to about 92 wt % sorbitol solution comprising about 65 to about 75 wt % sorbitol, and (b) about 1.0 to about 1.5 wt % crystalline sorbitol powder together with a film-forming agent and a crystallisation retardant. The solutions have a different sorbitol content and the product is dried between the application of the two layers. The product is reported to be smooth, hard and crunchy.

The coating with sorbitol as described for example in WO 81/01100 and EP 0 273 856 is widely used due to the ease of handling of this polyol. Moreover sorbitol is relatively inexpensive. The major drawback of the use of this polyol is that the resulting coating layers do not show the same crunchiness and crispiness as the conventional sucrose-based coatings. Alternatives for the use of sorbitol are therefore awaited.

Coating with xylitol is described for example in U.S. Pat. Nos. 4,105,801; 4,127,677; and 4,146,653. Xylitol is used for its cooling effect and its well-known cariostatic properties.

U.S. Pat. No. 4,238,510 describes sugarless coated comestibles wherein the coating consists essentially of sorbitol alone or in admixture with mannitol, and/or hydrogenated starch hydrolysate. Such coatings are not comparable in hardness to the coatings obtained with normally employed sugars.

Other patents describe hard coating using other polyols such as Isomalt, maltitol and erythritol (WO 95/07625 and JP 6292511).

Also the idea of a sequential coating with first several layers of one polyol and then several layers of another polyol has been proposed (U.S. Pat. No. 5,376,389). The main advantage of such a process would be the lower price of the raw material and the reduced hygroscopicity (WO 95/07622).

SUMMARY OF THE INVENTION

The present invention discloses that a combination of sorbitol syrup and a selected polyol gives rise to a crispy and crunchy coating when applied to edible, chewable or pharmaceutical cores.

The present invention discloses a sugarfree hard coated comestible obtained by treating a core portion with a sorbitol syrup and at least one other polyol in crystalline form. Preferably, the polyol is selected from the group consisting of isomalt (equimolar mixture of alpha D-glucopyranosyl 1,6 sorbitol and alpha-d-glucopyranosyl 1,6-mannitol; available under the brand name PALATINIT® from Südzucker AG), xylitol, maltitol and erythritol.

The present invention discloses a process for coating cores wherein the sorbitol syrup is applied to a rotating mass of cores and then at least one other of the selected polyols is added in a crystalline or powdered form. The coated cores are dried and the process is repeated until a coating of the desired thickness and composition is obtained.

The sugarfree coatings of the present invention are applied to edible, chewable and pharmaceutical cores. Preferably the sugarfree coatings of the present invention are used for coating chewing gum, confectionery products (such as candies), chocolate and nuts.

The present invention discloses products which have been coated with the composition containing sorbitol syrup and at least one other crystalline polyol.

DETAILED DESCRIPTION OF THE INVENTION

The present invention discloses a process for coating cores wherein the sorbitol syrup is applied to a rotating mass of cores and then at least one other of the selected polyols is added in a crystalline form. The coated cores are dried and the process is repeated until a coating of the desired thickness and composition is obtained. The cores are composed of edible, chewable or pharmaceutical material.

The process of the present invention is performed as follows.

As coating solution a sorbitol-syrup with dry substance of about 60 wt % to about 95 wt % and a sorbitol-content more than about 60 wt % is used. The syrup is applied to the rotating cores at a temperature of 20–60° C. The cores are in a rotating pan (speed 10–30 rpm) small portions of the syrup are added and the syrup forms a thin film on the surface of the cores. The solution may also contain gelatine, gum-arabic or celluloses and other known ingredients as binding-agent.

After the cores are moistened by the syrup a small portion (max. about 4% of the weight of cores) of crystalline xylitol, Isomalt, maltitol or erythritol (granulometry <200 μm) is brought on the surface of the cores. The coated cores are dried. To reduce drying-time air with a temperature of 15–45° C. and a moisture content of at most 50% relative humidity is applied. When the cores are dry the process is repeated until the desired thickness and composition of the coating is reached.

By repeating the described process, coatings of from 1 to about 100 layers are easily obtained, preferably the number of layers is between 1 and 40. The optimal amount of layers will depend on the desired applications and can be determined experimentally.

Different polyols can also be applied as mixture of crystals or in separate layers. Optionally the last or finishing layer or layers may contain components to give the product a glossy appearance.

Obviously slight adaptations of the process may be necessary with regards to temperature, drying time, concentration of sorbitol and amount of crystalline polyol without departing from the present invention. Such adaptations depend on the quality and type and composition of the ingredients employed. Moreover the type of equipment such a drying pan, rotating drum may also influence the exact conditions.

Colours like titanium dioxide or others are applied by addition to the sorbitol syrup. Liquid flavours are used by addition to the syrup, powdered flavours are used in a blend with the crystalline polyol.

In addition to the polyols hydrocolloids are generally added to an amount of about 3% such hydrocolloids include gum arabic, gelatine and cellulose.

The final coating contains the crystalline polyols in an amount of less than 20 wt %, for xylitol a preferred amount would be 15% as at this concentration the cariostatic effect is present, for Isomalt and erythritol the amounts can be even lower than 10%. In general polyols with a lower solubility have a greater effect.

When the method of the present invention is applied to hard coating of chewing gum any conventional chewing gum centre (or core) may be used. Preferably the centre is sugarfree and contains sorbitol, mannitol, xylitol, lactitol, maltitol and/or hydrogenated starch hydrolysate. The gum centre constitutes from about 35 to about 65% of the chewing gum product.

The present invention is illustrated by way of the following examples.

EXAMPLE

A) Coating

The following conditions were used to prepare the chewing gums. The coating solution was a sorbitol syrup with dry substance of 70% and a sorbitol-content of 97%. The syrup was applied to the cores at room temperature (20–25° C.). The cores were in a rotating pan (speed 20 rpm, diameter 0.5 m, velocity at outer circumference 1 m/s). The pan contained 2 kg of centres and the uncoated chiclets' weight was 121 g each. For the first ten layers 10 ml of sorbitol syrup was added. From layer twenty the amount was increased to 25 ml and from layer 37 it was further increased to 35 ml. Every fifth layer 1 min. after the addition of the sorbitol solution 0.57% (based on the weight of the centres) of C*Eridex ((erythritol from cerestar) fine fraction, <100 micrometers) was added. The coating process was stopped after 40 layers. This resulted in a coating of 4.2% (by weight).

The solution may also contain gelatine, gum-arabic or celluloses as binding-agent. Crystalline maltitol, xylitol and Isomalt were brought on the surface of the cores under similar conditions. To reduce drying-time air with a temperature of 15–45° C. and a moisture content of <50% relative humidity can be applied. When the cores are dry the process is repeated until the desired thickness of the coating is reached.

Colours like titanium dioxide (in the present case 0.5%) or others are applied by addition to the syrup. Liquid flavours are used by addition to the syrup, powdered flavours are used in a blend with the crystalline polyol.

This process was used to prepare coatings based on sorbitol syrup with crystalline maltitol, Isomalt and erythritol. Pure sorbitol syrup and sucrose were used as blanks.

B) Determination of Crunchiness

The crunchiness of a coating layers is normally only determined by sensorial tests. To apply a more quantitative method the following system was evaluated.

The hardness of the coating-layer was measured with a Stable Micro Systems Texture analyser XT.RA, dimension V3.7A.

The measurement-system was equipped with a needle with a diameter of 1 mm and the force required to penetrate this needle 1 mm into the coating layer was measured.

It was found, that samples, which showed a desired crunchiness had the maximum penetration force at a shorter penetration-distance than 1 mm. To quantify this finding maximum force was divided by the penetration-depth at maximum force in mm. This figure is defined as the 'crunchiness-factor' the higher the figure, the more crunchy the coating layer. This was verified by sensorial testing. The dimension of this 'crunchiness-factor' is g/mm.

Immediately after coating, the following 'crunchiness-factors' were found.

| | |
|---|---|
| Sucrose | 1675 g/mm |
| Sorbitol-syrup pure | 1030 g/mm |
| Sorbitol-syrup + Maltitol powder | 854 g/mm |
| Sorbitol-syrup + Isomalt powder | 2583 g/mm |
| Sorbitol-syrup + Erythritol powder | 2018 g/mm |

The advantage of this coating is the increased crunchiness and crispiness compared to a pure sorbitol coating. The best results are obtained by the use of a crystalline polyol with lower solubility compared to sorbitol like Isomalt or Erythritol.

What is claimed is:

1. A process for coating edible, chewable or pharmaceutical cores with a coating of at least one layer, said process comprising (a) applying a sorbitol syrup to a rotating mass of cores;
   (b) adding a polyol in a crystalline form comprising at least one member selected from the group consisting of xylitol, erythritol, and isomalt to obtain a product;
   (c) drying the product; and
   (d) repeating (a)–(c) until the cores have a coating with the desired number of layers, the desired thickness, and composition are obtained.

2. The process according to claim 1, wherein (a)–(c) are reiterated between 1 and 100 times.

3. The process according to claim 1, wherein (a)–(c) are reiterated between 1 and 40 times.

4. The process according to claim 1, wherein the sorbitol syrup has a sorbitol-content of more than 60 weight %.

5. The process according to claim 4, wherein the syrup is applied to said rotating cores at a temperature of 20–60° C.

6. The process according to claim 1, wherein the product is dried using air at a temperature of 15° C.–45° C. and a moisture content of at most 50% relative humidity.

7. A process according to claim 1, wherein said sorbitol syrup further comprises a liquid flavoring agent.

8. A process according to claim 1, wherein a powdered flavoring agent is blended with said at least one polyol, and that polyol-containing blend is used in (b).

9. The process according to claim 1, wherein the polyol comprises at least one selected from the group consisting of xylitol, erythritol and isomalt; and wherein the polyol selected in (b) is not identical in each layer.

* * * * *